INVENTOR.
W.R.SMITH

INVENTOR.
W.R.SMITH

INVENTOR.
W.R.SMITH

Aug. 11, 1970 W. R. SMITH 3,524,054

HIGH FREQUENCY TRACK CIRCUITS FOR RAILROADS INTERRELATED AT SWITCHES AND CROSSOVERS

Filed Jan. 8, 1968 5 Sheets-Sheet 5

INVENTOR
W.R.SMITH

United States Patent Office 3,524,054

Patented Aug. 11, 1970

3,524,054
HIGH FREQUENCY TRACK CIRCUITS FOR RAILROADS INTERRELATED AT SWITCHES AND CROSSOVERS

Willis R. Smith, Rochester, N.Y., assignor to General Signal Corporation, Rochester, N.Y., a corporation of New York Filed Jan. 8, 1968, Ser. No. 696,204
Int. Cl. B61l 23/22
U.S. Cl. 246—37 7 Claims

ABSTRACT OF THE DISCLOSURE

High frequency track circuits for train detection are applied to the main line tracks by the use of bonds without insulated joints, and train control codes for automatic train operation are also supplied over the same circuits by a distinctive high frequency. Separate track circuits of a distinctive high frequency are supplied for the turnout tracks without interrupting the main line track circuits and with suitable extensions to fully complete the train control or automatic operation high frequency paths through the switches and for portions of main track in a way to avoid interruption of such train control communication. The turnout track is also supplied with interconnecting circuits with the main track to assure power current return paths via the rails for the train driving motors. All of this is accomplished with a minimum of insulated joints at the switches to separate the main line track from the turnout track and by using only a single track circuit for the turnout track adjacent switches. Special selecting circuits are provided for the train control frequencies in view of the arrangement of the above mentioned track circuits.

BACKGROUND OF INVENTION

This invention relates to high frequency track circuits for railroads, and more particularly pertains to the interrelationships of high frequency track circuits at switches as used in connection with train control or automatic train operation.

In prior systems, it has been proposed to provide high frequency track circuits with bonds at the ends of such track circuits without insulating joints, and to provide that successive track circuits are supplied with different distinctive frequencies. This could result in requiring a large number of different frequencies. These track circuits have what might be termed as receiving bonds for picking up the transmitted frequency when no trains are present, and which of course fail to pick up such frequencies in any significant amount when a train is present. Also, this frequency is modulated with a tone or subfrequency to distinguish it from self-generated frequencies. The received energy is appropriately decoded and is used to operate train detecting apparatus.

In addition to the train detection frequencies above discussed, other distinctive frequencies have been applied to the track circuits and inductively received on the vehicles for controlling such vehicles. When such train controlling frequencies were used in connection with switches, there were usually so-called dead sections wherein the controlling frequency is not inductively received. Such dead sections have been tolerated in the usual train control apparatus by providing a delay in the automatic application of the brakes sufficient to allow the train to pass completely thorugh such dead sections.

However, when automatic train operation was contemplated, it was immediately appreciated that such dead sections could not be tolerated, because the train needed to have substantially continuous reception in order to continue to operate. In addition, automatic train operation usually requires a number of distinctive controls for which it was not feasible to employ additional frequencies. Such controls involve the starting and stopping of the rail vehicle as well as governing the speeds at which such vehicle is to run.

In addition, the automatic train operation of the rail vehicles usually requires that the rails be used for return power current for the electrically powered traction units. This of course provides complications with regard to the inter-relation of the high frequency track circuits at turnout track switches.

In accordance with the present invention, it is proposed to use a special frequency in all track circuits for supplying the train control information. A pair of different frequencies are used for train or vehicle detection on the main track, and each frequency of the pair is used respectively in alternate track circuits. In the event there is a second main track a different pair of frequencies is used for train or vehicle detection; and, each frequency of the pair is used respectively in alternate track circuits. A sixth distinctive frequency is used in each turnout or crossover track circuit for the purpose of train or vehicle detection.

When a switch connects a turnout track to a main track, the track circuit for that particular turnout track is separate and electrically isolated from the track circuit for the main track. However, the dead section which would normally be present is obviated by the present invention by extending the turnout track circuit by the use of cable or wires laid along the rails on the supporting ties through the switch and up to the first bond in the main track. These cables or wires form an integral part of the turnout track insofar as the automatic train operation is concerned since the high frequencies of the automatic train operation can be picked up inductively from such cables by vehicle carried apparatus. However, in order for this automatic train operation frequency to be initiated, it requires the detection of the train, but, in this portion of the track where the cables or wires are located there is no train detection for the turnout track. Thus, the train must be detected by the track circuit for the main track which effects initiation of the automatic train operation frequency for the turnout track circuit until the train reaches the turnout track where it is detected. This means that the automatic train operation frequency applying circuit must be selected in a novel manner for both single switch turnouts and multiple switch crossovers. In addition, certain selections of the automatic train operation frequency for the main track and turnout track have to be selected in accordance with the occupied or unoccupied conditions of the corresponding track in both the main track and turnout track for the sake of safety.

SUMMARY OF INVENTION

This invention comprises a railway signaling system where a continuous main track without insulated joints is divided into a plurality of track circuits having high frequencies applied at intermediate points in such track circuits. The high frequency is different in alternate track circuits and such frequencies are applied through bonds tuned to the particular frequency being applied. Bonds are located at the two ends of each track circuit, and the same bond is used for both frequencies where two track circuits join. Such bonds are tuned to each frequency they are to receive. In this way the frequency from one track circuit is positively shunted by the transmitting bond in the next adjoining track circuit.

This invention further comprises a railway signaling system with a main railway track having its own high frequency track circuits with a turnout track having its two rails wholly insulated from the main track but operatively connected thereto for the passage of cars. A bond is connected across the two rails of the main track and this bond has a midtap. A power current connection from one of the rails of said turnout track is made to said midtap on said bond. A high frequency transmitter is provided for said turnout track as well as a high frequency detector. A high frequency track circuit is provided for said turnout track including its two rails which have wires connected thereto running along the rails therefrom and along a portion of the main track to a point closely adjacent to the bond. There is also means for connecting the high frequency transmitter to one end of the track circuit and the high frequency detector to the other end of the track circuit.

In addition to the system as above explained, there is an additional transmitter for a different high frequency connected at one end of the turnout track circuit which frequency is modulated with a frequency tone characteristic of the desired operation of a train so that the train carried apparatus will be responsive to the tone on the different high frequency received from turnout track circuit including the wires along the portion of main track.

The additional transmitter for the different high frequency is connected at one end of the turnout track circuit and is effective, when rendered active, to transmit its frequency modulated with a tone in a coded form selected in accordance with the desired train operation. The first high frequency detector is effective when a train is present on the turnout to render the additional transmitter active to transmit its different high frequency with the coded tone. The train carried apparatus is responsive to the coded tone on the different high frequency received from the turnout track circuit for controlling the operation of such train.

The railway signaling system for railroads also includes in addition to the main railway track having its own high frequency track circuits, a turnout railway track wholly insulated from the main railway track but operatively connected thereto through a track switch for the passage of railway vehicles. There is a bond connected across the rails of the main track which is tuned to the frequency on the track circuits of the main track and is provided with a midtap. A wire connection from one of the rails of the turnout track is made to the midtap of the electrically tuned bond. In addition there is a track circuit for the turnout including the rails of such turnout and wires connected from the rails running through the rails of the switch and a portion of the main track up to a point closely adjacent to the bond connected across the main track. A high frequency transmitter is associated with each end of the turnout track circuit, and one or the other of such transmitters is selectively rendered effective depending upon the desired direction of traffic. Train carried apparatus is responsive to the high frequency on the turnout rails and the wires through said switches and said portion of main track for automatically operating the vehicle.

For a better understanding of the present invention, together with other and further objects thereof, reference is had to the following description, taken in connection with the accompanying drawings.

Figure 1:
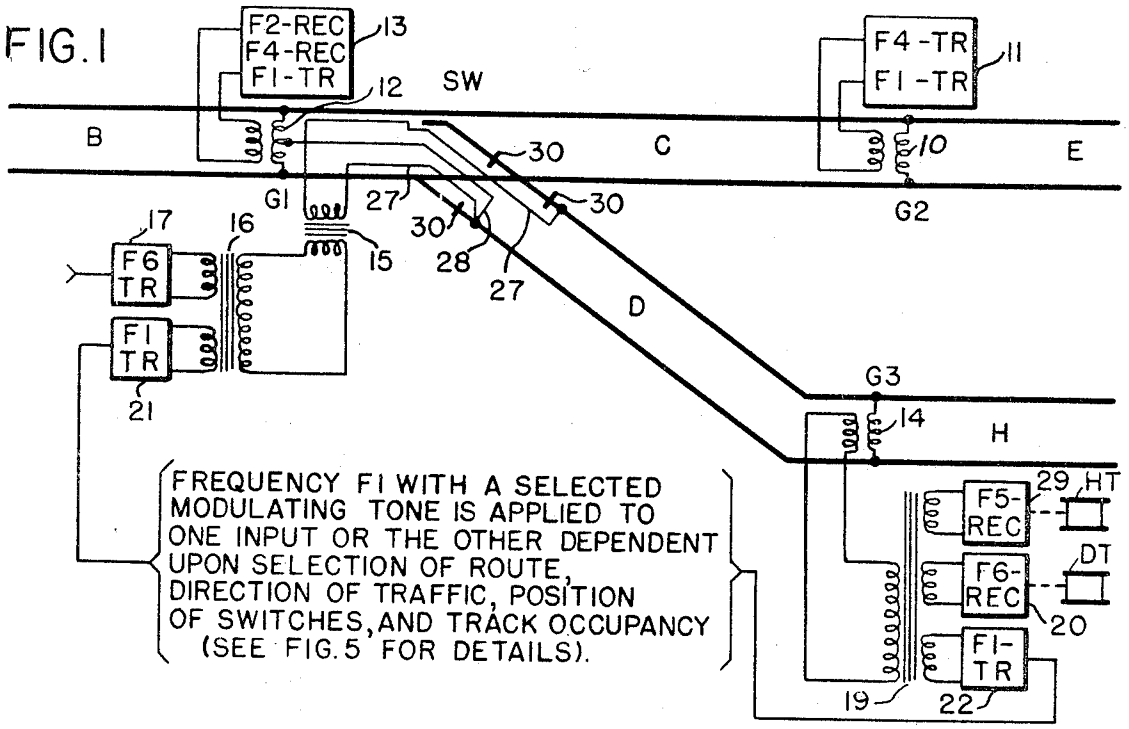
FIG. 1 is a diagrammatic illustration of the high frequency track circuits as relating to a single switch turnout.

In order to simplify the illustrations in the drawings and to facilitate in the explanation of the fundamental characteristics of the invention, various parts and circuits have been shown diagrammatically in accordance with conventional symbols. Arrows with associated symbols (+) and (—) are employed to indicate connections of the circuits of various relays and other circuitry to the opposite terminals of suitable sources of current. The various contacts of relays involved in the illustrations are shown conventionally and certain electrical components are diagrammatically illustrated by block diagrams with suitable explanation of their functions.

Figure 3:
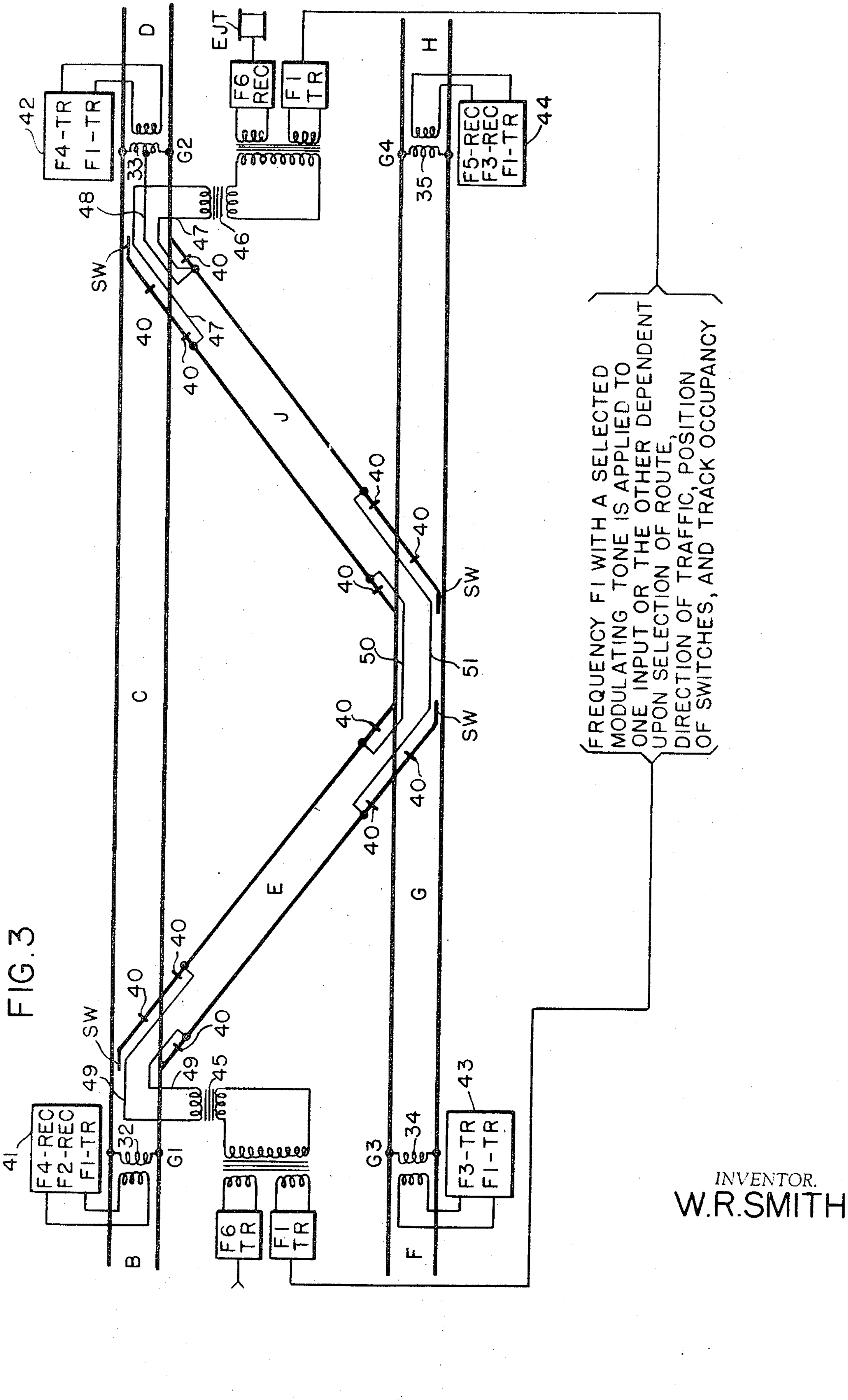
FIG. 3 is a diagrammatic illustration of the high frequency track circuit as relating to a multiple crossover.
Figure 4:
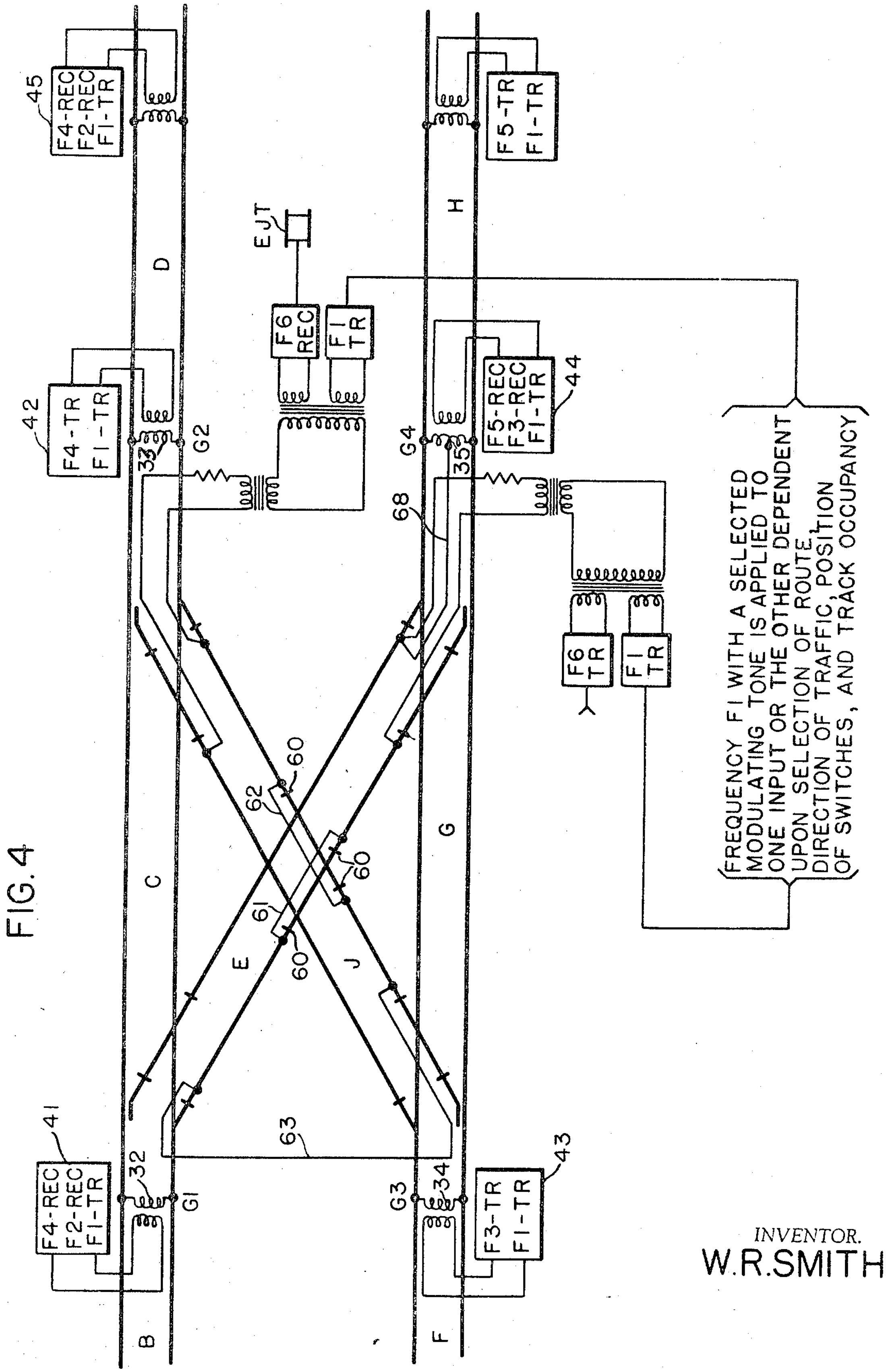
FIG. 4 is a diagrammatic illustration of the high frequency track circuit as relating to a scissors type multiple crossover.
Figure 5:
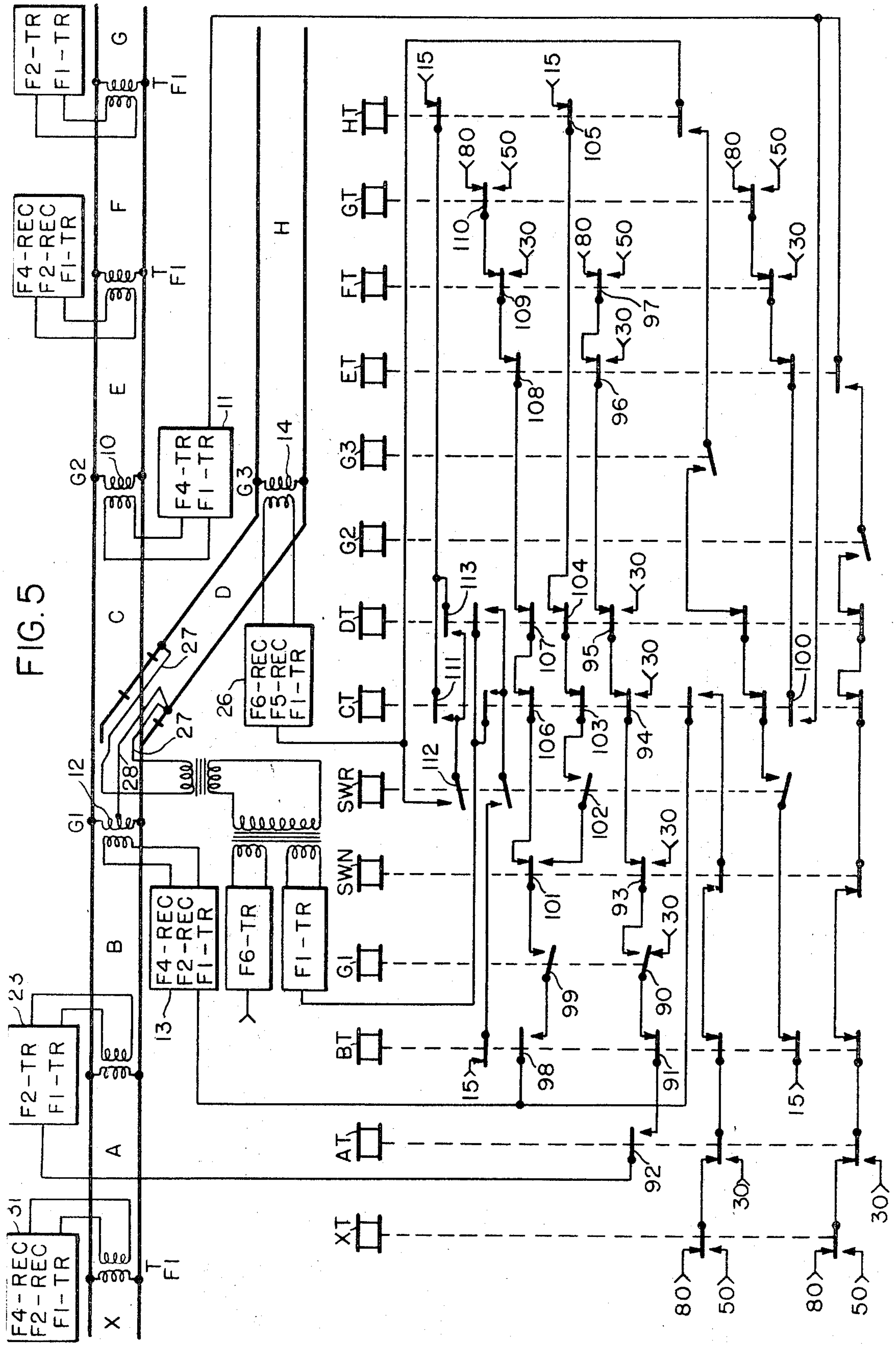
FIG. 5 is a detailed illustration of the selection of wayside circuits useful to select the speed codes for use with train control and automatic train operation in connection with a single switch turnout as illustrated in FIG. 1.
Figures 6, 7, 8:
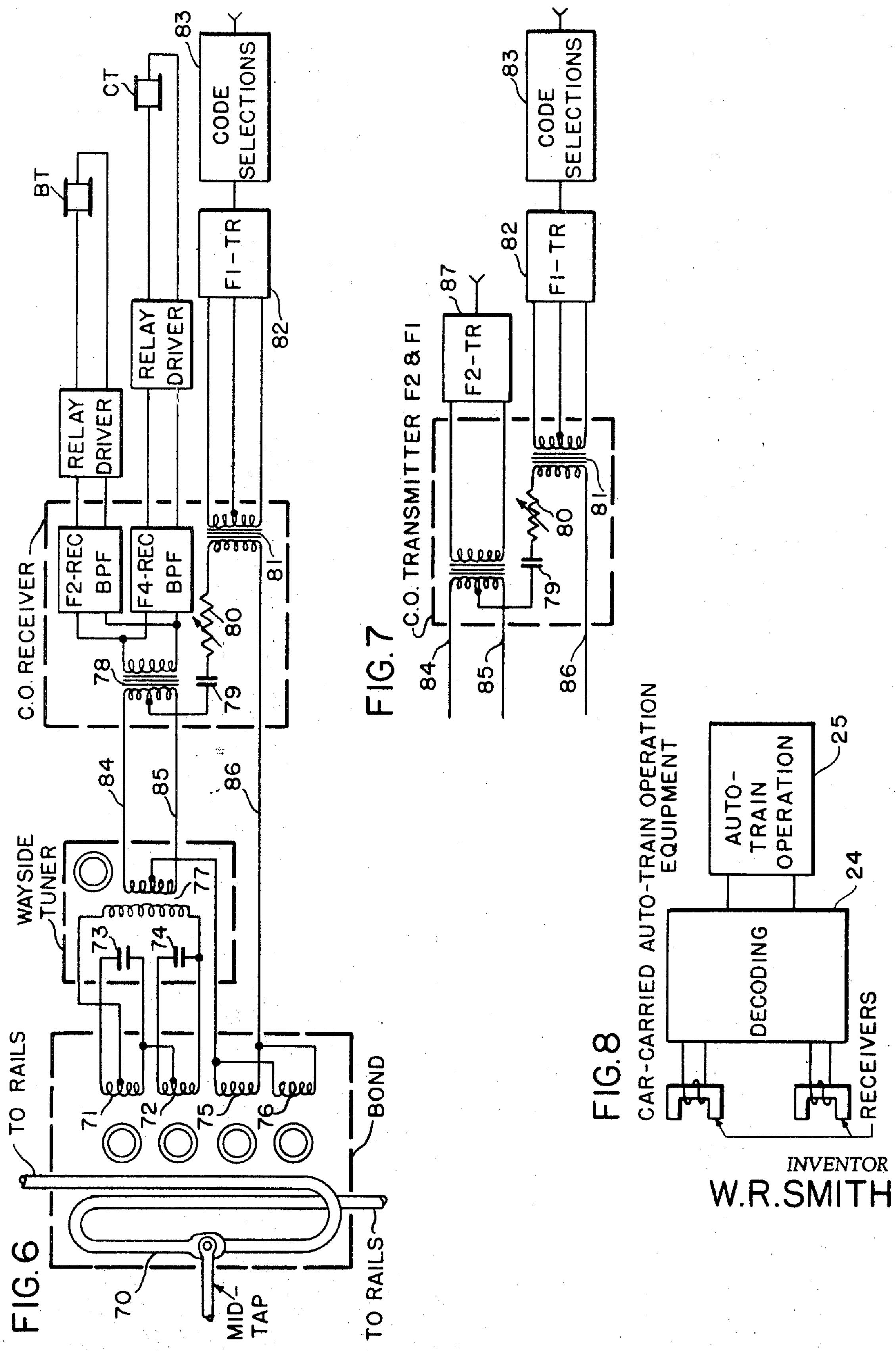
FIG. 6 is a more detailed illustration of a track bond, and the circuitry associated therewith brings the conditions of a track circuit into a central location.
FIG. 7 is a modification of FIG. 6 showing the apparatus for transmitting the codes from a central location to a wayside track circuit location.
FIG. 8 is a diagrammatic illustration of a vehicle carried apparatus for an automatically operated train.

In FIGS. 1, 2, 3 and 4, the general organization of the high frequency track circuits is shown in a diagrammatic manner; whereas, in FIG. 5 the details of the selections of the different automatic train operation control frequencies are shown. FIG. 6 illustrates the detail of a bond and the manner in which the train detection frequencies are electrically received over the track rails; while FIG. 7 shows how FIG. 6 changes to transmit a train detecting frequency. Both FIGS. 6 and 7 show how a train control or automatic train operation frequency is transmitted at each and every bond location. FIG. 8 illustrates in block form the vehicle carried automatic train operation equipment.

With reference to FIG. 1, a stretch of main track having section B, C and E is connected to a turnout track section D through a switch SW. The turnout track section D connects to a secondary main track of which section H is shown in part. The turnout track section D is the usual section following the switch SW where a vehicle or car on such track section D might foul or undesirably engage a vehicle or car on the section C. The points G2 and G3 are well beyond the fouling points, and these points including G1 are sufficiently in advance of the switch SW to provide adequate detector locking for the switch.

These points G1, G2 and G3 are also known as gates or signal points for either manual or automatic computer control of the traffic over the switch SW. In addition, bonds are located at these points for establishing train or vehicle detection as well as control. More specifically, the bond 10 has its main winding connected across the rails. Inductively coupled to this main winding is a transmitter of frequency F4 designated within the block 11 as F4–TR. This frequency F4 is transmitted in both sections C and E for which there are receivers for F4 at the ends of these sections. Such receiver at the right-hand end of section E is not shown. However, the bond 12 has its main winding connected across the rails with a receiver for frequency F4 inductively coupled to it as designated within the block 13 as F4–REC.

There is assumed to be a transmitter for frequency F2 (not shown) to the left-hand end of section B, so that a receiver for frequency F2 is inductively coupled to the main winding of bond 12 and designated within the block 13 as receiver F2–REC. The bond 14 has its main winding connected across the rails between sections D and H.

At each bond there is a transmitter for a frequency F1 designated within the blocks 11 and 13 as F1–TR. Although these transmitters actually transmit their frequency in both directions, when activated, they are only activated when a train is approaching their respective points over the main track, so that it can inductively receive the codes being transmitted on such frequency F1. This will be discussed in greater detail hereinafter.

The track circuit including section D is extended from the point G3 to the point G1 by wires or cables 27 connected to the rails of section D and laid on the ties parallel along such rails through the switch SW to a point closely adjacent to the connection of bond 12 to the rails and then connected to the secondary of transformer 15.

This cable 27 need be relatively small since it only carries the high frequency currents; but it should be strong enough and with suitable covering to be physically exposed and suitably attached to the ties. In this connection, closely adjacent to the point of connection of the bond 12 means within a few inches such as in the order of six or eight inches.

Another cable 28 is connected to the lower rail of section D and extends to the midtap of bond 12. Such connection of cable 28 could be to the upper rail of section D but this would require a longer cable. Such cable 28 must be of sufficient size to carry the power current from the rail of section D to the rails of sections B and C through the midtap of bond 12. This type of cable connection is the preferred form since it is believed to be the most economical. However, if desired, a similar cable could be interconnected between the midtaps of the bonds 10 and 14.

The primary of the transformer 15 is connected to the secondary of another transformer 16 which has several primary windings. One of these primary windings is connected to a transmitter for frequency F6 which is designated as F6–TR within the block 17. This frequency F6 is therefore transmitted continuously over the track circuit including section D and is picked up by the secondary winding on bond 14. This frequency F6 is then connected through a primary winding on transformer 19. Transformer 19 has several secondaries of which one feeds a receiver for frequency F6 designated F6–REC in block 20 which decodes the frequency F6 and supplies an output to actuate the track relay DT.

Also, associated with the transformer 19 is a secondary winding and receiver designated F5–REC within block 29 and is actuated by the frequency F5 transmitted from the right-hand end of section H (not shown); and this frequency F5 is decoded within block 29 and supplies an output to actuate track relay HT. A transmitter for frequency F1 designated F1–TR within block 21 and another transmitter designated F1–TR within the block 22 is for transmitting train operation codes by the frequency F1 depending upon the desired control and direction of movement of the train. In the drawings, the selections for the input to the transmitters 21 and 22 is designated by a legend, i.e. "Frequency F1 with a selected modulating tone is applied to one input or the other dependent upon selection of a route, direction of traffic, position of switches, and track occupancy" (see FIG. 5 for details). This is sufficient information for the description at this point, but these selections will be considered in greater detail hereinafter in connection with a discussion of FIG. 5.

These track circuits just described in connection with FIG. 1 use frequencies F2 and F4 for the detection of a train or vehicle when the rails are shunted by it. The frequency F1 is used for controlling the operation of such train. Such a train is indicated in FIG. 8 as having receivers for inductively picking up the frequency F1 and supply such input to a decoding apparatus 24 which in turn supplies a controlling input to the apparatus 25 controlling the automatic train operation.

Let us assume that a train such as indicated in FIG. 8 is approaching the control point G1 from the left end of section B. The presence of such train on section B shunts the detection frequency F2 which is detected by receiver designated F2–REC within block 13. This causes the frequency F1 to be applied by the transmitter F1–TR within block 13 dependent upon the conditions of the route in advance by apparatus not shown in FIG. 1. Assuming that this train is to proceed over the main track, as soon as it enters the section C, the rails are shunted which causes the shunting of the frequency F4 for the receiver F4–REC of block 13. This causes the frequency F1 to be applied by the transmitter F1–TR of block 11 so coded that the train will proceed over the section C in accordance with the control code received dependent upon traffic conditions in advance. Similar operation occurs for each succeeding track section along the main track.

However, when the switch SW is reversed and it is intended that the train proceed from section B into section C and over the switch SW reversed into the turnout section D, the train is detected when it enters section C but it is not detected by section D until after the train passes the insulated joints 30 electrically separating section D from section C. Thus, it can be seen that the section C in detecting a train must act the same as section D when the switch is reversed. However, the train has its receivers R pass over the cable 27 along the rails in that portion of track between the bond 12 and the rails of section D and will receive the control frequency F1 inductively from such cable until such receivers actually pass over the rails of section D. The frequency F1 transmitted by the transmitter F1–TR of block 22 is of course controlled in accordance with the traffic in advance, the direction of traffic, and other means as described hereinafter. However, the train detection by F4–REC of block 13 must initiate transmitter F1–TR of block 22 until the train is detected by receiver F6–REC of block 20. The travelling of the train in the reverse direction is effected in a similar manner.

Figure 2:
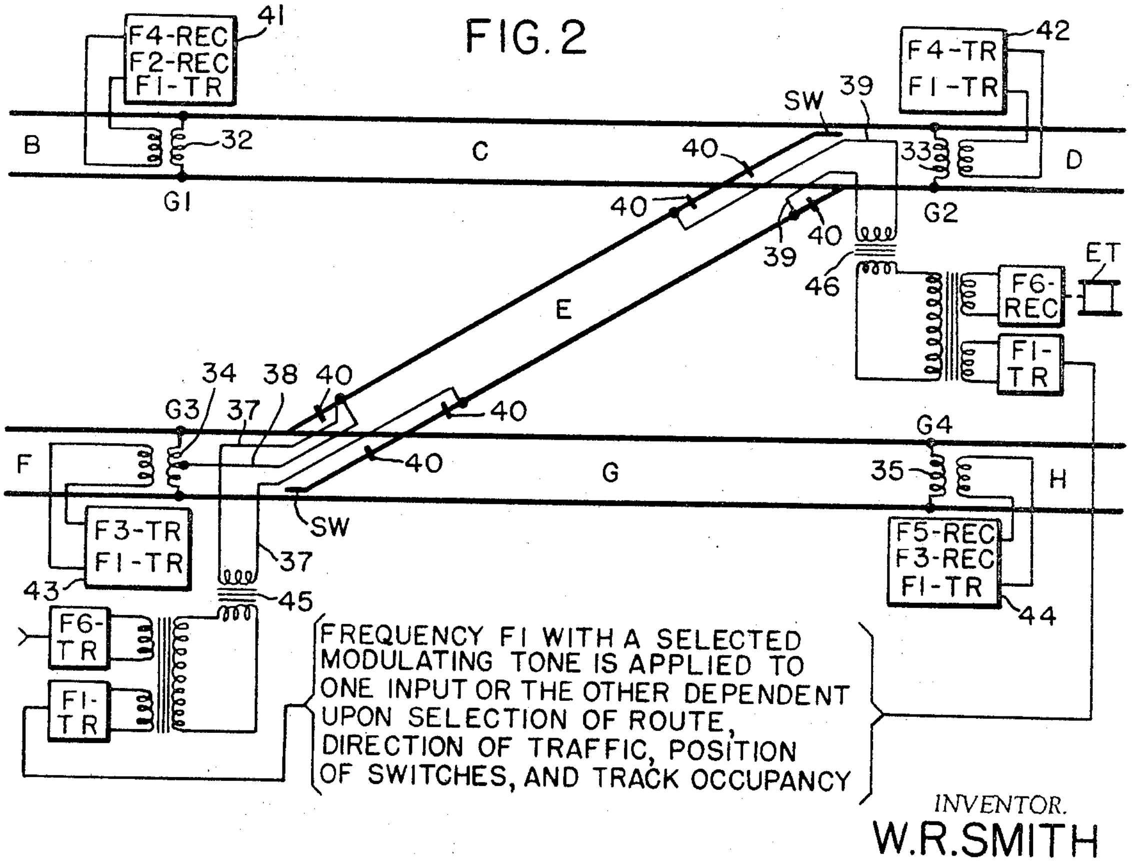
FIG. 2 is a diagrammatic illustration of the high frequency track circuit as relating to a single crossover.

With reference to FIG. 2, a main track is divided into sections B, C and D by the bonds 32 and 33 located at control points G1 and G2 respectively. The frequencies F2 and F4 are used in alternate track circuits for train detection the same as described above for FIG. 1. The frequency F2 is transmitted from the left-hand end of section B (not shown) and is received by the receiver F2–REC in block 41. The frequency F4 is transmitted by the transmitter F4–TR in block 42 through the bond 33 into sections C and D. The receiver F4–REC for section C is found in the block 41. A similar receiver would be found at the bond at the right-hand end (not shown) of section D.

A second main track is divided into sections F, G and H by bonds 34 and 35 located at control points G3 and G4 respectively. This track uses a different pair of frequencies for train detection which for convenience are designated frequencies F3 and F5. The transmitter F3–TR shown in block 43 supplies such frequency through the bond 34 to bond sections F and G. A receiver for this frequency is designated F3–REC in block 44. The frequency F5 is transmitted from the right-hand end of section H (not shown) and is received by the receiver F5–REC in block 44.

The section E is electrically separated from both main tracks by the use of insulators 40 which are symmetrically located at the oppostie ends of the crossover section E and are in the same symmetry as employed for the insulators 30 in FIG. 1. The section E is thus provided with a crossover track circuit which is extended at both ends by suitable wires or cables. More specifically, the cable 37 extends from the section E along the ties inside of the switch rails and through a portion of the second main track up to a point closely adjacent to the bond 34. The cable then includes the primary winding of the transformer 45. At the other end of the section E the cable 39 extends from the section E along the rails of the switch and through a portion of the main track up to a point closely adjacent to the connection of bond 33 across the rails. The cable 39 then connects to the primary of transformer 46. As explained in connection with FIG. 1, the two cables 37 and 39 are suitably fastened to the ties preferably on the inside of the rails to a point closely adjacent to the connection of the associated bond to the rails. Such closely adjacent point is considered for convenience to be in the order of six or eight inches.

In FIG. 2, the power return current is routed from one rail of section E by the connection of cable 38 to it with the other end of such cable connected to the midtap of bond 34. This cable 38 is believed to be connected at a point to minimize its length. However, if desired, another bond could have its main winding connected across the rails of section E with its midtap connected through a suitable cable to the midtap of bond 34, or the midtap of bond 33. Such cable 38, and any cable connected to an auxiliary bond, should be of sufficient size to carry the return power current for the vehicle or train.

In connection with the auxiliary bond, it would have to be tuned to the frequency F1 and F6 in order for it to avoid shunting such frequencies in the section E. As will be described later, each bond is substantially a shorting connection between the two rails for direct current and any alternating currents that may be applied across the rails. However, when such bond is tuned to a particular frequency it then provides a relatively high impedance to any voltages of such frequency appearing across the rails. Thus, if an auxiliary bond is used across section E, it must be tuned to the frequencies which are used in the crossover track circuit. Since these frequencies for crossover and turnout track circuits are always F1 and F6, such bond would have to be resonated for such frequencies. For these reasons such an auxiliary bond would be an additional expense over the simple connection of one of the rails to the midtap of the adjacent bond at one end of the crossover.

The frequency F6 is transmitted in the crossover track circuit including section E from the transmitter F6-TR and is received by the receiver F6–REC at the other end of the track circuit for section E. Such receiver F6–REC actuates the associated track relay ET so that it is normally energized so long as the frequency F6 is received; but when section E is occupied by a vehicle or train relay ET is released. Since a train may approach the crossover in either direction, the control therefore is transmitted by actuating the transmitter F1–TR at one end or the other of the crossover selectively dependent upon the route set up This is indicated in the legend, i.e. "Frequency F1 with a selected modulated tone is applied to one input or the other dependent upon selection of a route, direction of traffic, position of switches, and track occupancy." This is sufficient information for the present, but such selections will be considered in greater detail hereinafter.

FIG. 3 is similar to FIG. 2 since the main track is divided into sections B, C and D by bonds 32 and 33, and the second main track is divided into sections F, G and H by bonds 34 and 35 located at control points G1, G2, G3 and G4 respectively. For this reason all of the track circuit apparatus for the main tracks has been given the same reference characters as found in FIG. 2. However, there are two crossovers in sections E and J involving four switches SW. The sections E and J are connected in series by wires or cables 50 and 51 laid on the ties running parallel to the rails through the switches SW adjacent a portion of the second main track. At the upper ends of the sections E and J the crossover track circuit is extended exactly as shown for the switches SW in FIG. 2. More specifically, cable 47 extends from section J along the ties inside of the switch rails and through a portion of the main track up to a point closely adjacent to the bond 33. The cable 47 then includes the primary winding of transformer 46. At the upper end of section E, cable 49 likewise extends along the rails of the switch through a portion of the main track up to a point closely adjacent to the connection of bond 32 across the rails. The cable 49 then connects to the primary of transformer 45. As previously explained, the two cables 47 and 49 are suitably fastened to the ties preferably on the inside of the rails to points closely adjacent to the connection of the associated bond to the rails. Such closely adjacent point is considered to be in the order of six or eight inches from the bond connection.

The frequency F6 is transmitted by the transmitter F6–TR and traverses both the sections E and J and the cable sections so that the receiver F6–REC energizes a track relay EJT dependent upon both such sections E and J being unoccupied. The lower rails of the sections E and J are connected through cable 48 to the midtap of the bond 33. This cable must of course be heavy enough to carry the power current; and since the connecting cable 51 connects the lower rail of section E in series with the rail of section J, it too must be heavy enough to carry the power current. This organization is believed to give the most economic circuitry for power return current.

However, a separate bond may be used, if desired for sections E and F, with its midtap connected to the midtap of bonds 33 through a suitable cable large enough to carry the power current. However, such auxiliary bond must be tuned to the frequencies F1 and F6 in order to avoid shunting such frequencies in the crossover sections of the track circuit employing the frequency F6 for the train or vehicle detection. In such a case, cables 50 and 51 should both be of a proper size to carry the power current.

The frequency F1 is used for the train control or automatic train operation, and transmitter F1–TR are selectively used for transmitting from either end of the track circuit dependent upon the various conditions, i.e. "Frequency F1 with a selected modulating tone is applied to one input or the other dependent upon selection of a route, direction of traffic, position of switches, and track occupancy."

FIG. 4 shows a scissors crossover and an extension of the main track to more adequately show how the track circuits are actually center fed track circuits with receiving apparatus on each end. The two crossover sections E and J are connected in series the same as shown in FIG. 3 but in a slightly different way. The crossover track circuit has the frequency F6 transmitted from the transmitter F6–TR to the receiver F6–REC for effecting the energization of EJT in the same way as shown in FIG. 3. However, the tracks cross each other so that one of the tracks on each section E and J needs to be isolated from the other tracks. This is effected by the placing of insulated joints 60. Cables 61 and 62 are provided to complete the track circuit around the insulated joints 60 in their respective rails. These cables carry the track circuit current frequency F6 and also the train controlling frequency F1. This latter frequency F1 can be picked up by the receivers on a train as it passes over these cables. This means that there is no dead section where these rails cross.

The insulated joints adjacent each of the switches are arranged in a similar symmetrical fashion with regard to each switch SW as shown in the prior figures, so as to electrically isolate the adjoining crossover tracks from the main tracks. The isolated lower crossover tracks are connected together through cable 63 at their extreme ends, and this cable 63 extends the track circuit up to points closely adjacent to the connection of the bonds 32 and 34 across the rails. The return rail for power current is connected through cable 68 to the midtap of bond 35. This cable must of course be large enough for the power current. However, in this configuration there is no return power current carried by the cables 61, 62 and 63 so that they do not need to be large as cable 68, but can be of a suitable size for strength and current load in connection with the high frequency track circuit.

The train control frequency F1 is transmitted from one end or the other of the crossover track circuit depending upon the conditions in connection therewith as stated in the legend, i.e. "Frequency F1 with a selected modulating tone is applied to one input or the other dependent upon selection of the route, direction of traffic, position of switches, and track occupancy."

TRACK CIRCUITS

Each track circuit on a main track is a center fed track circuit including two sections such as sections C and D of FIG. 4. The transmitter F4–TR of block 42 transmits the frequency F4 in opposite directions from the bond 33. This frequency is received by bond 32 and is fed to the receiver F4–REC of block 41 which actuates a track relay CT (see FIG. 6). The frequency F4 is also transmitted through section D and is received by the receiver F4–REC in block 45. This receiver also actuates a track relay. When a train enters a particular section, the track relay for that section is released because the frequency for that section is shunted; but the train as it passes through the track circuit shunts both relays for that track circuit only when it is shunting the rails of both sections on the opposite sides of the transmitting bond location such as bonds 33 in the above example.

Each bond shunts the rails for all frequencies except the ones to which it is tuned or resonated. It is well known that the use of high frequencies limits the distance to which such frequencies can travel, and the track circuits are normally designed so as to have the track relay respond throughout the various variations in ballast conditions and the like. Thus, the use of two frequencies, each in alternate track circuits, is an additional safety factor since even though a frequency travels past the receiving bond for some reason such frequency cannot pass the next transmitting bond because it is not tuned for such frequency. For example, and with reference to FIG. 4, the frequency F2 received by the receiver F2–REC in block 41 may not shunt all of such frequency, but in the event such frequency should extend to the bond 33, it would be entirely shunted since such bond is not tuned to frequency F2.

It is noted that the frequency F1 used for train control or automatic train operation information is transmittable from each bond location, but such transmission is effected only when that location is the next one in advance of a train. In other words, an approaching train occupies a particular track section and deenergizes the track relay for that section which in turn causes the frequency F1 to be transmitted from the bond at the advance end of that section. This will be explained in greater detail with regard to FIG. 5.

CENTRAL CONTROL

Since there are a number of different routes, and since it is contemplated that individual train operation is controlled from each bond location, it is desirable to have the bond controlling apparatus centrally located at various points along the railroad. For example, the apparatus associated with the bonds for an interlocking can be brought together at a particular point as shown in FIG. 5. In order to do this there is apparatus associated with each bond such as shown in FIGS. 6 and 7.

The bond shown in FIG. 6 can be the bond 12 of FIGS. 1 and 5 for example; and it can be the bond 32 of FIGS. 2, 3 and 4. Each bond is formed by bars 70 of a good conductor to form a metal loop as shown in FIG. 6. The ends of the bars are fastened to the opposite rails of a track. The midtap connection on the bar loop is used for connection of a common feed cable for power return current. Such connection is used as described in the specification, and is also used in actual practice for attachment to a common return conductor. On the double portion of the loop, four toroidal coils are mounted so as to have such double portion pass through their centers. These coils are formed by having a molded iron center or core upon which their windings are mounted.

The bond of FIG. 6 shows four such toroidal coils. The coils 71 and 72 are tuned by the wayside tuner using capacitors 73 and 74 respectively. The coils 75 and 76 are connected in multiple and tuned at the central location as will be explained shortly. A transformer 77 is also of the toroidal type, i.e. a molded iron core with its primary and secondary windings wound around it in the form of a doughnut. The primary winding of the transformer 77 is connected across the lower halves of the coils 71 and 72 in series. The secondary of this transformer 77 is connected to the primary of transformer 78 which has its secondary connected to the band pass filters F2–REC and F4–REC in multiple. The output from these band pass filters is supplied to the respective relay drivers which decode the received energy and actuate their respective relays T.

Coils 75 and 76 are connected in multiple across each other and in turn across the midtap of the secondary of transformer 77 and the midtap of the primary of transformer 78. Included in this circuit are the capacitor 79, the resistor 80, and the primary of transformer 81 included within the central office receiver. The capacitor 79 is used to resonate the coils 75 and 76 to the frequency F1 while the variable resistor 80 is for varying the level of the energization of the track circuit.

The transformer 81 is supplied with the frequency F1 from the transmitter F1–TR. The detailed apparatus is not shown in this block 82, but such block 82 is assumed to include an oscillator, an amplifier, and a modulator, which will modulate the base frequency F1 with a tone or a frequency either applied steadily or time coded into pulses. The different codes are selected as desired and the transmission is rendered effective by the circuitry generally designated as "code selections" in the block 83. The bond of FIG. 6 could well be the bond 32 of FIG. 4 for receiving the frequencies F2 and F4 and transmitting the frequency F1 when required.

With reference to FIG. 7, the transmitter F2–TR is shown instead of the receivers F2–REC and F4–REC of FIG. 6. Wires 84, 85 and 86 of FIG. 6 correspond to wires 84, 85 and 86 of FIG. 7. The only difference is that the vehicle detection frequency F2 is supplied by the transmitter F2–TR by including a suitable oscillator and modulating apparatus for a modulating frequency or pulse coding such modulation, or any other type of code desirable. This transmitter F2–TR operates continuously so that coils 71 and 72 of FIG. 6 are supplied with such frequency, and in this instance the capacitors 73 and 74 should be such as to tune the coils 71 and 72 to the same F2 frequency.

The above description points out in connection with FIGS. 6 and 7 how the high frequencies are brought over line wires from the several bonds across the track rails into the central location for control and selection. The frequencies associated with the turnout track circuits are brought into the central location in a similar manner. The illustrations in FIGS. 1 through 5 are a diagrammatic representation of the functional communication; but the actual circuitry used is as shown in FIGS. 6 and 7. The transformers 15 and 16 of FIG. 1, for example, are respectively representative of the wayside bond and its associated wayside tuner as shown in FIG. 6

More specifically, the transformer 15 has a low resistance primary winding connected across the turnout track circuit; and it has a plurality of secondary windings each connected to the wayside tuner as shown in FIG. 6. This transformer 15 is also of the toroid type so that it is the full equivalent to the bond structure shown in FIG. 6. The winding on transformer 15 used for train detection frequency F6 is tuned to that frequency in the wayside tuner. The transformer 16 is representative of the wayside tuner and has the same toroidal character. The tuning capacitors of the wayside tuner are of proper sizes for the purposes involved. The circuits from the coils on the bond, or the coils on the equivalent transformer 15, are taken over line wires such as 84, 85 and 86 to the central location and there have receivers and transmitters as illustrated in FIGS. 6 and 7, except for the appropriate frequencies here involved.

In FIG. 1, the bond 14 is connected directly to the transformer 19 representing the connections between a bond and a wayside tuner shown in FIG. 6. The receivers 20 and 29, and the transmitter 22 are connected to the wayside tuner and bond in the same way as shown in FIG. 6, i.e. over line wires 84, 85 and 86. Thus it can be seen that the method of communication illustrated in FIGS. 6 and 7 is applicable to the turnout track circuits the same as for the other track circuits.

The above high frequency track circuits are considered high frequencies as compared to usual commercial frequencies, but are actually considered to be in the audio range, as, for example, 1 to 10 kc. It is understood that the lower the frequency, the longer the track circuits can be; whereas, the higher the frequency, the shorter is the distance available for track circuit use. However, the particular selection of the frequencies should be dependent upon the circumstances of practice. Also, these frequencies may be modulated in different ways. The train detection frequencies may be modulated with a constantly recurring frequency; whereas, the train controlling frequency may be modulated in several different distinctive ways in order to be able to transmit all of the train controlling information.

It is to be understood that the track circuit arrangements employed herein may be used in any suitable system or organization employing high frequency track circuits. The center fed track circuits explained above are contemplated as including the associated bonds tuned as explained herein, the rails and cable and the components for generating and detecting the signals. When a train occupies the track between bonds, its wheels and axles form a shunt path which shunts the receiving bond and robs it of a frequency signal. This causes the receiving bond and the related receiving apparatus to deenergize the track relay to indicate the presence of a vehicle or train. No insulated rail joints are required for the main tracks.

However, the turnout tracks are different in the sense that they include the transmitting and receiving apparatus, the rails, and cables along portions of the track so that the train controlling information can be received from the transmitter rendered effective substantially continuously in moving from section to section over either the main track or the turnout track. It is due to this arrangement that the circuit selections for the train controlling frequency at the turnout tracks has to be selected in a distinctive fashion in accordance with the principles of the present invention.

It is noted that the track circuits of FIGS. 1, 2, and 3 and 4 are connected in a serial symmetry with a train detection frequency F6 transmitted throughout such turnout track. This applies to the scissors crossover of FIG. 4. The distance that the cables extend into the main track for continuing the crossover track circuit up to a point closely adjacent where the associated bond on the main track connects across the rails, may vary in accordance with the particular requirements of the associated signaling. Such variation may be in the order of between five to twenty feet, although it should be understood that any suitable distance required can be employed.

With reference to FIG. 5, the various transmitters and receivers are distributed along the track as disclosed in FIG. 1 with certain additional sections supplied with associated apparatus to provide an extension of the main track. The apparatus associated with bond 14 of FIG. 1 has been simplified into block 26 in FIG. 5 for convenience of illustration. The wires leading to the blocks (such as block 11, 13, etc.) are for the transmitters to select the particular characteristic of the coding for the train controlling frequency F1. These selections cause the associated transmitter F1–TR to be modulated in a manner characteristic of the particular speed at which the train is to travel. These speeds have been indicated in FIG. 5 as being 15, 30, 50 and 80 miles per hour. No effort has been shown to include the signaling circuits for an entire system. These connections or selections shown are merely illustrative of certain principles of operation which will shortly be explained.

Across the middle of the FIG. 5 certain track relays have been designated XT, AT, BT, CT, DT, ET, FT, GT, and HT. These track relays have been designated so as to be associated with the respective track sections in the track diagram of FIG. 5. The control points or gates G1, G2 and G3 are designated as having relays with contacts which may be operated either manually or by automatic computer operated train controlling apparatus. Such computer would be located at a central point and would be programmed for appropriate automatic control of the trains through suitable communication means and including the operation of gate relays G1, G2 and G3. The switch points are shown as having a relay SWN which is energized when the switch is normal and another relay SWR which is energized when the switch is reversed.

The frequency for the train or vehicle detection for section A is F2 transmitted by the transmitter F2–TR of block 23. This frequency is received by the receiver F2–REC of block 31 and causes the energization of the track relay AT. When the train passes the associated bond, it causes the release of relay AT which initiates the transmission of the frequency F1 by the transmitter F1–TR of block 23 modulated for the proper control. This is because of the circuit from "30" through back contact 90 of control point G1 contact in a released position, front contact 91 of relay BT, and back contact 92 of relay AT to the transmitter F1–TR of block 23. This causes a speed control of thirty miles per hour to be transmitted by the transmitter F1–TR, which will be inductively picked up by the approaching train. Such information advises that the train must slow down to thirty miles per hour so it can stop in block B before it reaches the control point G1.

On the other hand, if the manual or automatic control actuates gate G1 for the passage of such train, the front contact 90 closes a circuit including contact 93 of relay SWN, front contact 94 of track relay CT, front contact 95 of track relay DT, front contact 96 of track relay ET, front contact 97 of track relay FT, through approriate circuitry to cause information to be conveyed by transmitter F1–TR of block 23 that the train may run eighty miles per hour indicated by "80." If this kind of information is displayed upon the entry of the train into section A, then the entry of train into section B will cause the same information to be given when back contact 98 of track relay BT is closed assuming that the front contact 99 of the gate control point G1 is closed and that there are no trains in the route in advance. This circuit is closed from "80" through front contact 110 of track relay GT, front contact 109 of track relay FT, front contact 108 of track relay ET, front contact 107 of track relay DT, front contact 106 of track relay CT, front contact 101 of switch relay SWN, front contact 99 of gate G1, back contact 98 of track relay BT to transmitter F1–TR of block 13 to cause the modulation of frequency F1 with the appropriate information for eighty miles per hour.

When the train enters the track section C, back contact 100 will be closed so that the transmitter F1–TR of block 11 will be set into operation giving the same high speed of eighty miles per hour to the train.

The above operation is the normal and expected operation for any suitable train controlling system. However, if the train is to be routed over the turnout, switch SW is reversed so that with the control point gate G1 closed, there is a circuit closed for transmitter F1–TR of block 13 through back contact 98 of relay BT, front contact 99 of gate G1, back contact 101 of switch relay SWN, front contact 102 of switch relay SWR, front contact 103 of track relay CT, front contact 104 of track relay DT, and front contact 105 of track relay HT, to "15" to provide the appropriate selection for fifteen miles per hour, for example.

When this train for the turnout passes the bond 12 of FIG. 5, the transmitter F1–TR of block 26 needs to be immediately initiated so that the train controlling frequency F1 can be immediately received inductively from the cables 27. The train is immediately detected by the receiver F4–REC of block 13 as soon as the wheels shunt the rails beyond the bond 12 which releases the track relay CT to close back contact 111. This back contact 111 completes a circuit to shunt the back contact 113 of track relay DT to immediately initiate the transmitter F1–TR of block 26. Both contacts 111 and 113 are in series with front contact 112 of switch relay SWR. Then when the car or train reaches the rails of section D, the track relay DT is released to close contact 113 and continue the operation of transmitter F1–TR of block 26 even through the track relay CT picks up and opens its back contact 111.

From the above description, it can be seen that any route that is established through the switch SW has circuit selections including in parallel contacts of both track relays CT and DT. This is because the section C and D must both be checked for occupancy since the turnout is close to the main track and car or vehicle on either the main track or turnout track could foul or sideswipe a car or vehicle on the other. In this connection, a turnout is considered to be a broad term applicable to either the track connecting a single switch or the track between two switches and commonly termed a crossover; whereas, the term crossover is considered as applicable only to a track between two switches and leading from one main track to another.

Another requirement illustrated in the above described circuitry is that the train will inductively receive frequency F1 from the cable leading to the turnout as soon as the bond in the main track is past and the train is to follow such cable onto the turnout. This means that the presence of the train on the main track must be detected and activate the transmitter for frequency F1 for the turnout before the train is actually detected on the turnout track. Thus, the track relay CT has a contact in series with a contact of switch relay SWR to shunt the open back contact of the track relay DT until after the train occupies such turnout track section D.

In brief, the turnout track section D and the main track section C are considered as the same section for any selections through the switch SW. From this it can be understood that the turnout track shown in FIGS. 2, 3 and 4 require similar selections for the turnout tracks shown therein with respect to the main track sections. Referring to FIG. 2, for example, it can be seen that a route through the main track section C should also check whether or not the turnout track E is occupied. Similarly, a through route on the second main track including section G should check whether or not the turnout track E is occupied. The same principles should be applied to the selection circuitry for FIGS. 3 and 4 which for convenience in the disclosure have not been shown in detail, especially since the legends associated therewith refer to suitable selections the principles of which have been shown in connection with FIG. 5.

From the above description, it should be understood that when the track sections adjacent the switch are occupied and such occupancy is to effect some function, the back contacts of the detector relays for such sections are connected in multiple as shown for the back contacts 111 and 113; whereas, when a route is to be checked to determine whether the track is available involving one of said sections, then the contacts for relays CT and DT are included in series such as contacts 103 and 104, for example. It can be also understood that not only are the turnout track sections, insofar as the train controlling frequency is concerned, elongated so to speak, so as to include complete communication for the passing trains, but special selections in connection therewith are also required to render such communications available.

It should also be appreciated that this type of track circuit disclosed herein lends itself to reporting its conditions to the central location by transmitting the frequency over line wires. This avoids the use of repeater relays or like devices and brings the condition of the various track circuits directly to the location where the selections are made for routing the trains. Also, the actual control of the operation of the trains can be selected in accordance with the routes and direction of traffic established as well as by including the central office control which may be manually established, or as above pointed out, can be governed by a preprogrammed computer.

Having described several forms of the present invention, and at least one form of various related ancillary apparatus to facilitate in the disclosure of the invention, it is to be understood that various modifications, adaptations and alterations may be applied to the forms shown to meet the requirements of practice without departing from the spirit or scope of the present invention.

What I claim is:

1. A system of high frequency track circuits for a continuous rail main stretch of track having at least one turn out track connected thereto through insulated joints, each of the track circuits having means to transmit at a first frequency always in the same direction through the track rails for occupancy detection and having means to transmit at a second frequency in one direction or another through the track rails, in accordance with the direction of traffic, for the control of railway vehicles on the main track, wherein the improvement comprises;

(a) a high frequency track circuit for the turn out track having means to transmit at a third frequency at one end of the turn out track circuit through the track rails of the turn out track for occupancy detection, (b) the turn out track circuit having means to transmit at the second frequency from one end of the turn out track circuit or another through the track rails in accordance with the direction of traffic on the turn out track, and (c) means including receivers connected to the track circuits for sensing the presence of vehicles and selectively rendering the second frequency transmitters effective in accordance with the direction of traffic to always transmit in the direction of a vehicle approaching a second frequency transmitter.

2. The system according to claim 1 wherein the track circuit for the turn out track has a wire loop portion extending into the main track.

3. The system according to claim 2 wherein the track circuits in the main track are terminated by tuned impedance bonds and the wire loop extends from the rails of the turn out track to a point close to one of the bonds in the main track.

4. In a railway signaling system for railroads, a first main track having its own high frequency track circuits. a second main track having its own high frequency track circuits, a turnout railway track having its rails operatively connected to said main track through switches but electrically insulated from said main railway track, another turnout track having its rails operatively connected between said two main tracks through said switches but electrically insulated therefrom, means for forming a turnout track circuit by connecting said rails of said two turnout tracks in series and connecting a transmitter at one end of the track circuit and a detector at the other end of the track circuit, whereby the presence of a train on either or both of said turnouts is detected.

5. A system as specified in claim 4 wherein said turnout track circuit is extended at each end by wires connected to the ends of the turnout rails and extending along a portion of the main track up to a point closely adjacent to the nearest bond on the main track before connecting at their respective ends to said transmitter and said detector.

6. A system as specified in claim 4 wherein an additional transmitter for a different high frequency is connected at one end of said track circuit and such frequency is modulated with a frequency tone characteristic of the desired operation of a train, and train carried apparatus responsive to the different high frequency with the tone thereon received from the turnout track circuit including the rails thereof, the interconnecting series wires and the wire extensions of said track circuit.

7. A system as specified in claim 4 wherein said two turnout tracks form a scissors crossover with one rail of each crossover electrically insulated from the other rails and a single wire is used to connect the ends of said one rails in series, said wire extending along portions of both main tracks up to points closely adjacent to the nearest bonds on said main tracks.

References Cited

UNITED STATES PATENTS

| | | | |
|---|---|---|---|
| 2,651,713 | 9/1953 | Florencourt | 246—63 |
| 3,286,091 | 11/1966 | Ferm et al. | 246—34 X |
| 3,345,511 | 10/1967 | Staples. | |
| 3,345,512 | 10/1967 | Failor | 246—37 |

FOREIGN PATENTS

| | | |
|---|---|---|
| 832,510 | 4/1960 | Great Britain. |

ARTHUR L. LA POINT, Primary Examiner

G. H. LIBMAN, Assistant Examiner

U.S. Cl. X.R.

246—34, 63, 114